United States Patent [19]

Dolan

[11] Patent Number: 5,304,328
[45] Date of Patent: Apr. 19, 1994

[54] PACKING ELEMENT

[75] Inventor: Michael J. Dolan, Brecksville, Ohio

[73] Assignee: Norton Chemical Process Products Corporation, Worcester, Mass.

[21] Appl. No.: 9,525

[22] Filed: Jan. 27, 1993

[51] Int. Cl.⁵ .............................................. B01F 3/04
[52] U.S. Cl. .............................. 261/94; 261/DIG. 72
[58] Field of Search .......................... 261/94, DIG. 72

[56] References Cited

U.S. PATENT DOCUMENTS

| | | | |
|---|---|---|---|
| Re. 27,217 | 11/1971 | Eckert | 261/94 |
| 3,957,931 | 5/1976 | Ellis et al. | 261/98 |
| 4,041,113 | 8/1977 | McKeown | 261/98 |
| 4,067,936 | 1/1978 | Ellis et al. | 261/98 |
| 4,122,011 | 10/1978 | Strigle, Jr. | 210/150 |
| 4,197,264 | 4/1980 | Degg | 261/98 |
| 4,203,934 | 5/1980 | Leva | 261/98 |
| 4,275,019 | 6/1981 | Bednarski | 261/DIG. 72 |
| 4,277,425 | 7/1981 | Leva | 261/98 |
| 4,303,599 | 12/1991 | Strigle, Jr. et al. | 261/98 |
| 4,333,892 | 6/1982 | Ellis et al. | 261/98 |
| 4,600,544 | 7/1986 | Mix | 261/79 A |
| 4,806,288 | 2/1989 | Nowosinski et al. | 261/94 |

FOREIGN PATENT DOCUMENTS

| | | | |
|---|---|---|---|
| 317166 | 12/1919 | Fed. Rep. of Germany | 261/94 |
| 139880 | 3/1920 | United Kingdom | 261/94 |
| 185681 | 9/1922 | United Kingdom | 261/94 |

OTHER PUBLICATIONS

U.S. Patent Application Serial No. 08/007,886; Filed Jan. 22, 1993.

*Primary Examiner*—Tim Miles
*Attorney, Agent, or Firm*—David Bennett

[57] ABSTRACT

Metal strips are provided which can be bent into the shape of cylindrical packing elements of the Lessing or Pall ring type. These strips have one end bent back at an acute angle to the rest of the strip and have slots cut into the strip in the vicinity of the bend. At the opposed end tabs are provided that engage with the slots when the strip is formed into a cylinder so as to hold the ends together. Such packing elements have a much greater resistance to crushing than conventional elements and can be made of much thinner metal.

4 Claims, 1 Drawing Sheet

PACKING ELEMENT

BACKGROUND OF THE INVENTION

This invention relates to packing elements use in mass transfer and direct heat transfer applications and specifically to packing elements of a generally cylindrical shape, such as for example Pall and Lessing rings.

Such elements are used in reactors where liquids and gases are contacted so as to bring about a reaction, heat transfer, solution or dissolution operations by intimately contacting two flowing fluids. As a consequence they have shapes designed to maximize surface area while retaining dimensional stability such they they do not collapse or become crushed during use. One means of achieving this end is to form the rings from cylindrical metal blanks, and providing internal structure by a variety of suitable techniques.

It is however desirable to have a structure that is easily produced to a standard design in large volumes. To satisfy these requirements the elements are often stamped out of a flat metal plate intended to be bent into a cylindrical shape with a plurality of flaps cut from the plate and bent inwards towards the axis of the cylinder. This is the shape of the typical Pall ring and is described for example in U.S. Pat. No. Re. 27,217. Another type of ring is the so-called Lessing ring in which a metal strip is bent into a cylindrical shape and one end of the strip is bent inwardly along a chord of the cross-section of the cylinder.

In order to retain the rigidity of such a ring it needs to be shaped from a relatively thick metal plate that will have be able to withstand the compressive forces encountered in use. Lacking such rigidity the rings will become compressed under the loading in the tower and more rings will be needed to fill the tower. In addition compressed rings do not have the same performance characteristics such that some predictability in operation is lost.

On the other hand it is desirable to reduce the thickness of this metal plate to save weight and to make the rings less expensive.

One solution has been to use a pair of bridging members to hold two cooperating semicylindrical pieces together as is described in U.S. Pat. No. 4,197,264. This has a significant disadvantage in that the production process requires the combination of four separate components to make the final product.

The present invention provides a metal strip that can be used to form a relatively rigid packing of the Pall or Lessing ring type while allowing the use of thinner gauge metal. The strip is so designed that it can be made into a packing element of the above type in a simple bending operation readily adapted to the use of mass production techniques.

DESCRIPTION OF THE INVENTION

The present invention provides a metal strip, having first and second end zones adjacent the ends thereof, adapted to be bent into a generally cylindrical form to produce a packing element; wherein the first end zone is provided with a bend such that, when the element is formed, the end of the strip is within the cylinder and the first end zone is further provided, in the vicinity of the bend, with one or more slots; and in which the second end zone is provided with one or more tabs projecting from the end of the strip and adapted to engage with the slots in the first end zone so as to lock the ends together when the strip is formed into a cylindrical packing element.

The strips preferably have the same number of slots and tabs and each preferably have dimensions such that the tabs fit easily into the slots but do not have a significantly loose fit such that unintended disengagement can occur. The tabs may conveniently be bent to lock the ends more rigidly and this can be done before or after the formation of the element. The position of the bend in the tabs controls the extent of deformation of the cylindrical element under compressive forces. Generally the bend is at the point of attachment to the second end zone such that when the bend is formed, the ring cannot readily be deformed. The tab can have any convenient shape such triangular or rectangular but a simple, rectangular shape is often all that is required. Its length should be adequate to prevent unintended disengagement during use but not so long as to require extensive deformation of the cylinder to engage and disengage.

The cooperating tabs and slots are preferably located at the midpoint of the end zones, (if there is only a single cooperating pairing), or evenly distributed in the axial direction of the finished cylindrical element in the event a plurality of cooperating slots and tabs are provided.

The slots can be formed in the first end zone at the bend therein or adjacent to the bend, usually on the side adjacent the end. Preferably the slots are formed in the bend itself so as to allow formation of a perfect cylinder rather than one with off-set or overlapped ends.

Such packing rings have a rigidity that greatly exceeds that of the prior art rings without the attachment means. This rigidity can be further enhanced by providing peripheral flanges formed on the longitudinal edges of the metal strip such that, in the packing ring, the flanges will be formed around the top and bottom ends of the rings. The flanges preferably project in such a direction that they will not impede the bending of the strip into a ring shape. Thus in the finished ring the flanges project radially outwards rather than inwards. The flange preferably terminates short of the first end zone of the strip such that the flanges do not contact when the tab and slots are engaged but permit a limited degree of flexing of the ring before they come into contact. This contact limits the amount of deformation that can occur in normal use and renders the ring quite rigid. The flange however does not prevent disengagement of the tabs and slots.

The metal from which such rings are made is largely dictated by the environment in which it is designed to be used. Since this is often corrosive to some degree, it is conventional to use a resistant steel such as stainless steel, which is usually costly.

The gauge of the metal strip from which a Pall or Lessing ring or similar structure is conventionally constructed is from about 0.65 mm to 1.00 mm and more typically from about 0.75 mm to about 0.85 mm. The improved packing ring structure of the present invention allows the use of metal strip of gauge down to about 0.10 mm and preferred packing ring structures are constructed from metal strips of 0.15 mm to 0.60 mm gauge.

The conventional packing element structures are cylinders formed from a bent strip of metal and are sometimes, (particularly with Pall rings), provided with a plurality of inward flap projections cut from the bent strip and arcing inwardly toward the axis of the cylinder but terminating short of the axis. The number and size of these projections is not critical and is largely a function of the dimensions of the ring and the desired surface area. The provision of such projections is also an optional feature of the packing rings formed from metal strips of the present invention.

Initial test data indicate that the rings according to the present invention can support up to 950 lb/ft² which is about equal to the supportable load for a ring of the same dimensions, made from steel strip that is 50% thicker, but which lacks the attachment means that characterizes the rings of the present invention. This means that deeper tower beds of packing can be employed without the need for intermediate support structures to avoid crushing the rings in the lower portions of the tower. In addition the use of thinner gauge steel leads to significant cost advantages for the structure of the present invention.

DRAWINGS

The attached drawings are described as follows.

DESCRIPTION OF PREFERRED EMBODIMENTS

Figure 1:
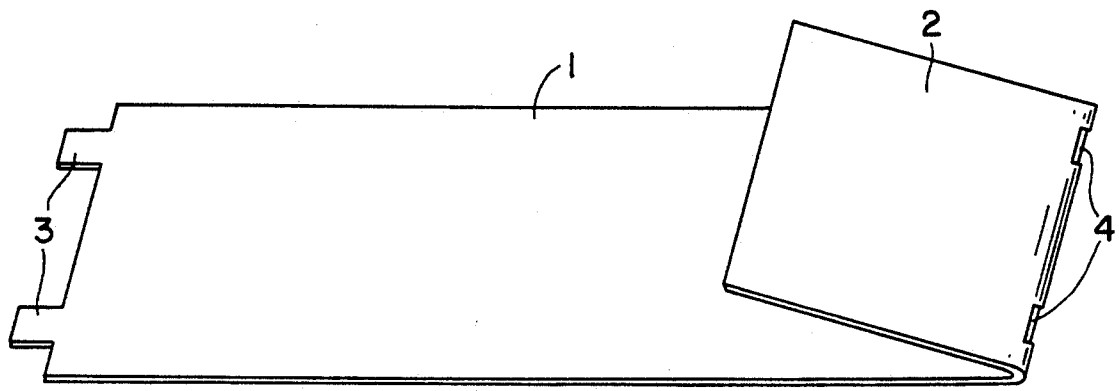
FIG. 1 is a perspective elevation of a metal strip adapted for the production of a Lessing ring, before it is bent into a cylindrical shape, and showing the tabs and slots.

The invention will now be further described with specific reference to the embodiment illustrated in the Drawings which are for illustration only and are intended to imply no limitation on the essential scope of the invention.

In the Drawings, and referring initially to FIG. 1, a metal strip, 1, is provided at one extremity with a portion, 2, bent back at an acute angle to the rest of the strip. Slots, 4, are formed in the strip at the angle of the bend. At the opposed end of the strip, tabs, 3, are formed in positions corresponding to the slots, 4, at the opposed end.

Figure 2:
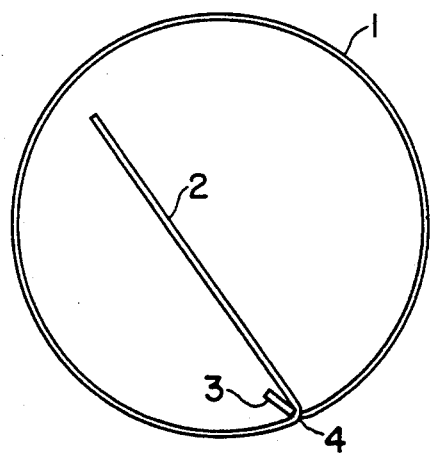
FIG. 2 is top view of a Lessing ring made from a strip of the present invention as shown in FIG. 1 and illustrating the use of the slots and tabs to attach the ends together.

FIG. 2 shows the strip of FIG. 1 bent to form a cylindrical Lessing ring-type structure. The bent back portion, 2, is within the cylinder and the slots, 4, are at the angle of the bend. The tabs, 3, pass through the slots and are bent to engage the surface of the bent back portion, 2, and hold the ends together.

Other types of metal strips suitable for the production of other kinds of cylindrical packing elements could be designed with means for holding the ends together as shown in the above invention. For example Pall rings could be made by modifying the conventional strip with cut out flaps designed to be pressed out to project into the cylinder to add the bent-back terminal portion and the cooperating tabs and slots illustrated above.

Metal strips for producing all such cylindrical packing elements, and the packing elements formed therefrom, are understood to be within the purview of this invention.

What is claimed is:

1. A metal strip adapted to be formed into a cylindrical packing element, said strip having first and second end zones adjacent the ends thereof, adapted to be bent into a generally cylindrical form to produce a packing element; wherein the first end zone is provided with a bend such that, when the element is formed, the end of the strip is within the cylinder and the first end zone is further provided, in the vicinity of the bend, with one or more slots; and in which the second end zone is provided with one or more tabs projecting from the end of the strip and adapted to engage with the slots in the first end zone so as to lock the ends together when the strip is formed into a cylindrical packing element.

2. A metal strip according to claim 1 in which the slots are formed at the angle of the bend.

3. A metal strip according to claim 1 having two or more pairs of slots and cooperating tabs.

4. A packing element formed by bending a strip according to claim 1 into a generally cylindrical shape and engaging the tabs with the cooperating slots in such a way as to hold the ends together.

* * * * *